United States Patent
Wivagg et al.

(10) Patent No.: US 7,092,477 B2
(45) Date of Patent: Aug. 15, 2006

(54) BWR INSPECTION MANIPULATOR

(75) Inventors: Adrian Peter Wivagg, Tolland, CT (US); Paul Joseph Boone, Bethel Park, PA (US); Paul R. Radovich, Sr., Winnabow, NC (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 0 days.

(21) Appl. No.: 10/676,453

(22) Filed: Oct. 1, 2003

(65) Prior Publication Data

US 2005/0135904 A1 Jun. 23, 2005

Related U.S. Application Data

(60) Provisional application No. 60/440,187, filed on Jan. 15, 2003, provisional application No. 60/415,454, filed on Oct. 1, 2002.

(51) Int. Cl.
*G21C 17/003* (2006.01)

(52) U.S. Cl. ........................ 376/249; 245/248

(58) Field of Classification Search ............... 414/567, 414/569, 689, 917; 376/305, 306, 309, 310, 376/248, 258, 260, 249; 901/8, 14–16
See application file for complete search history.

(56) References Cited

U.S. PATENT DOCUMENTS

| | | | | |
|---|---|---|---|---|
| 3,638,806 A | * | 2/1972 | Hippach | 212/231 |
| 4,349,837 A | * | 9/1982 | Hinds | 348/116 |
| 5,053,187 A | | 10/1991 | Haller | |
| 5,205,174 A | * | 4/1993 | Silverman et al. | 73/623 |
| 5,271,046 A | * | 12/1993 | Dirauf et al. | 376/249 |
| 5,456,130 A | * | 10/1995 | Pierson et al. | 74/469 |
| 5,504,788 A | * | 4/1996 | Brooks et al. | 376/248 |
| 5,571,968 A | * | 11/1996 | Buckley | 73/623 |
| 5,784,425 A | | 7/1998 | Morlan | |
| 5,878,099 A | * | 3/1999 | Burrows et al. | 376/260 |
| 5,930,316 A | * | 7/1999 | Kowdley et al. | 376/249 |
| 5,964,029 A | | 10/1999 | Weems et al. | |
| 6,058,153 A | * | 5/2000 | Kurosawa et al. | 376/249 |
| 6,145,583 A | * | 11/2000 | Gay et al. | 165/11.2 |

* cited by examiner

*Primary Examiner*—Eileen D. Lillis
*Assistant Examiner*—Gregory W. Adams

(57) ABSTRACT

A reactor service manipulator delivery system supported on a remotely operated trolley that travels on top of a track attached to the steam dam of a BWR shroud. The trolley has a mast and pulley system designed to manipulate a TV camera for inspection of various reactor components inboard and outboard of the shroud at the same time that fuel is being moved within the core during a refueling operation so that refueling can be performed in parallel with the inspection.

18 Claims, 7 Drawing Sheets

BWR INSPECTION MANIPULATOR

CROSS REFERENCE TO RELATED APPLICATION

This application is a Continuation-in-Part of Provisional Applications U.S. Ser. No. 60/415,454, filed Oct. 1, 2002 and U.S. Ser. No. 60/440,187, filed Jan. 15, 2003.

BACKGROUND OF THE INVENTION

This invention pertains in general to nuclear reactor service manipulators and more particularly to a manipulator supportable on a BWR reactor shroud which can inspect the areas adjacent the shroud without obstructing refueling.

RELATED ART

A boiling water nuclear reactor 10, as illustrated in FIG. 1, includes a reactor vessel 12, a core 14 made up of a plurality of fuel assemblies 16, and a core shroud 18 disposed concentrically within the reactor vessel around the core. Core shroud 18 typically includes upper and lower cylindrical sections 20 and 22 connected by a horizontal plate 24 extending radially inward from a bottom edge of the upper cylindrical section to an upper edge of the lower cylindrical section. A shroud head flange is welded to the upper edge of the shroud upper cylindrical section and extends radially inward to support a shroud head or lid 26 of generally hemispherical configuration, the lid being secured to the top of the shroud with bolts threadedly or otherwise engaged by lugs mounted in angularly-spaced relation about the shroud periphery adjacent the upper edge of the shroud.

Fuel assemblies 16 are supported at the bottom by a core plate 28 mounted on a core plate support ring extending radially inward from the bottom edge of the lower cylindrical shroud section and at the top by a top guide 30 mounted on horizontal plate 24. Control rod guide tubes 32 are provided within vessel 12 at locations above a control rod drive mechanism extending through nozzles located at the bottom of the vessel beneath the shroud. Lower ends of corresponding control rods are detachably connected to the driving mechanism and are arranged to move up and down within the guide tubes.

Feedwater enters the reactor vessel through a feedwater inlet 34 and is distributed circumferentially within the reactor vessel by a ring-shaped pipe 36 disposed above the shroud and known as a feedwater sparger. The feedwater mixes with other water coming from the steam separators and flows downwardly from feedwater sparger 36 through the downcomer annulus 38, that is, the annular region between the reactor vessel and the core shroud, and ultimately enters the core lower plenum 40. A portion of the other downcomer water and feedwater is withdrawn from the reactor vessel through a recirculation water outlet 42 and is fed under pressure into a plurality of jet pump assemblies 44 distributed circumferentially about the core shroud to produce a forced convection flow through the core. Boiling is produced in the core, creating a mixture of water and steam, which enters the core upper plenum, that is, the space under the shroud sealing lid, and is directed into steam plenum heads or stand pipes 46 mounted vertically on the shroud sealing lid in fluid communication with the core upper plenum. The mixture of water and steam flows through the stand pipes 46 and enters a respective plurality of steam separators 48, which are shown as being of the axial flow centrifugal type. The separated liquid/water then mixes with incoming feedwater and flows downwardly to the core via the downcomer annulus. The steam, on the other hand, passes through a steam drying assembly or dryer 50 disposed above the steam separators and is withdrawn from the reactor vessel through a steam outlet 52.

In a Loss Of Coolant Accident (LOCA), rupturing of the recirculation duct system or the steam duct system during operation can cause coolant water to flow out of the reactor vessel, thereby lowering the water level in the reactor vessel and exposing the core such that the fuel assemblies may become overheated and damaged. In order to prevent overheating of the reactor core during a LOCA, tubular core spray spargers 54 of semicircular configuration are oriented horizontally within the upper cylindrical section of the shroud 18 above top guide 30 and are apertured at multiple locations to supply water to the core. These semicircular core spray spargers are arranged in opposed pairs to form circular rings at two elevations, with core spray inlet or supplying piping 56 connecting upper and lower pairs of core spray spargers with nozzles formed in the reactor vessel above the shroud 18 at respective azimuthal locations. The connection at the core spray nozzle is made with a safe end assembly having a hollow, cylindrical safe end welded to the nozzle externally of the reactor vessel and a thermal sleeve which extends inwardly, toward the interior of the reactor vessel, from the safe end to a flow divider or T-box 58 disposed in the reactor vessel above the shroud. As best seen in FIG. 2, core spray supply piping 56 includes a pair of horizontal sections or arms 60, which extend circumferentially in opposite directions, from the T-box 58 to a pair of upper elbows 62 where the piping turns downwardly to connect with a pair of vertical sections 64. Each vertical section 64 of the piping extends downwardly from one of the upper elbows to a lower elbow 66 where the piping turns inwardly to penetrate through the shroud and connect with respective core spray spargers 54 disposed therein.

After periods of use, intergranular stress corrosion cracking of the core spray spargers and other sections of the core spray supply piping as well as other core components tends to occur as a result of corrosion, radiation and stress. The cracks usually occur in the heat affected zones of the welds that join the typically austenitic stainless steel piping and associated components of the core spray supply system and are predominantly circumferential, with axial cracks occurring less frequently. Such cracking can lead to crack opening widths which permit significant leakage from the core spray spargers and the core spray supply piping. Leakage from the core spray spargers inside the shroud is typically not considered to be a major problem; however, when significant leakage from the core spray supply piping occurs outside the shroud, the piping must either be replaced or repaired. Cracking can also occur in the welds joining other components such as the jet pumps.

Accordingly, it is desirable to inspect the areas around the core spray spargers, shroud and jet pumps during outages to assure that no unacceptable cracks have developed. This is usually accomplished through visual inspections which form part of the critical path of an outage, since it typically obstructs refueling of the core. If remote visual inspections of these areas could be performed without obstructing refueling, it would significantly reduce the extent of the outage and the costs associated with the plant out of operation. Visual inspections currently require three to five days of the critical path time.

SUMMARY OF THE INVENTION

Accordingly, it is an object of this invention to provide a method and apparatus that would reduce inspection time of components in the areas around the core shroud.

It is a further object of this invention to provide a method and apparatus that will increase the quality of the data gathered during visual inspections of the areas surrounding the core shroud.

Additionally, it is an object of this invention to provide a method and apparatus that provides visual inspection of difficult to access areas that had been previously considered inaccessible around the core shroud.

Further, it is an object of this invention to provide a method and apparatus that can provide a remote visual inspection of the area surrounding the core shroud without obstructing refueling.

These and other objects are achieved by a remotely operated system employing a motorized trolley assembly configured to ride on an upper lip of the core shroud or other tubular member to be inspected. A vertically oriented support column assembly having a first portion rotatably mounted on the trolley and at least one laterally extending arm extending from the first part, such that rotation of the column assembly positions a peripheral end portion of the laterally extending arm on an inboard side or an outboard side of the underlying tubular body. An extendable pole assembly having a first end attached to the laterally extending arm and having a plurality of telescoping sections nested in the second end for extending from the second end to a preselected elevation below the upper lip of the core shroud. An adjustable camera or other tool is attached to the second part of the extendable pole assembly via an arcuate track that can guide a camera around a 180° arc. Preferably, the trolley is supported by a 360° circular track that is seated on top of the core shroud lip. The track assembly is formed in sections for ease of shipment and can be adjusted to fit different diameter shrouds. Preferably, the motorized trolley includes a remotely operated cam that, when rotated, clamps onto the track to aid stability.

In the preferred embodiment, two laterally extending arms extend from the support column assembly respectively at spaced elevations. Each of the laterally extending arms support tracks on which one end of the extendable pole assembly is supported at corresponding spaced locations on the first part of the extendable pole so that the extendable pole is maintained parallel to the first part of the support column assembly. The laterally extending arms extend at a downwardly directed angle and the extendable pole assembly is moveable along the tracks on the laterally extending arms so that, when moved, the extendable pole assembly traverses both a horizontal and vertical path. When the extendable pole assembly is moved along that path to a point closest to the first part of the support column assembly, the support column assembly can be rotated to position the extendable pole assembly on either the inboard or the outboard side of the reactor core shroud. Once positioned on the intended side of the shroud, the extendable pole assembly can be lowered along the track of the laterally extending arms to position the telescoping sections for deployment axially adjacent the shroud. Preferably, the nested telescoping sections of the extendable pole assembly have square cross-sections to prevent rotation.

In the preferred embodiment, the camera supported at the end of the telescoping sections has a hydrolaser directed toward the camera's viewing area. Preferably, the hydrolaser includes two spray nozzles located to direct noninterfering streams of high pressure fluid in opposite directions to balance the reaction force on the camera.

A second camera can be positioned on a moveable carriage, extendable along a track to position the camera above the support column assembly to provide an overview of the operation of the tool. The tool can thus accomplish inspections without obstructing the core so as to enable refueling to be performed in parallel with the visual inspections.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
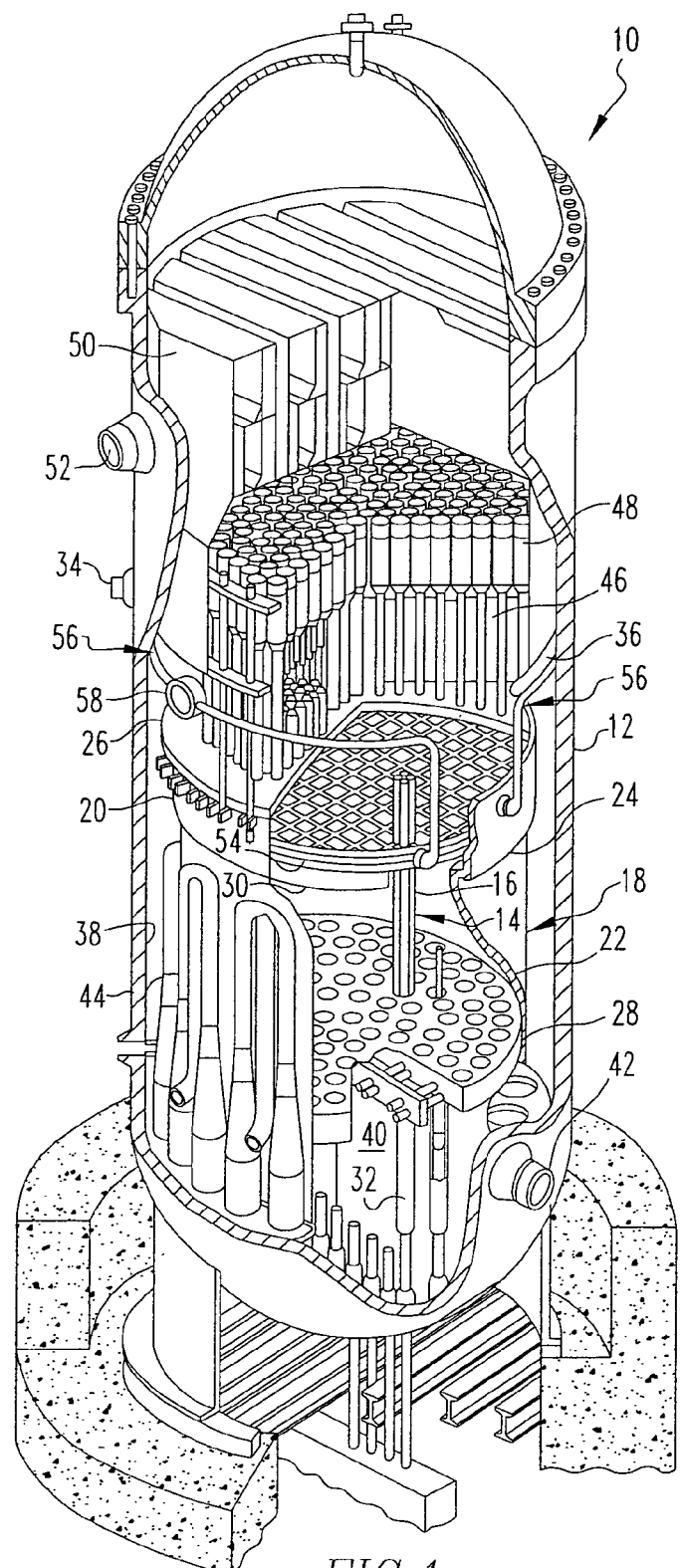
FIG. 1 is a cutaway view, in perspective, of a boiling water reactor exemplifying a type of reactor suitable for inspection by the method and apparatus of the present invention.

The service manipulator delivery system of this invention is a remotely operated trolley system 70 that operates on the top lip or steam dam 68 of a BWR shroud or track 80 attached to the shroud 18. The trolley system 90 supports a mast 102 and a pole system 106 designed to mount a TV camera assembly 120 for inspection of various reactor components at the same time that fuel is being moved within or into or out of the core. This allows two operations to be performed in the reactor at the same time, saving time.

During a BWR or PWR refueling outage, much of the work in the reactor is performed on a critical path. Formerly, visual inspections were performed at a different time than fuel movement because the same equipment, e.g., the refueling bridge, was needed for both tasks. By utilizing a remote controlled unit, such as that of this invention, that does not interfere with the fuel movement path to hold the visual inspection equipment, the operations can be done in tandem with great critical path time savings.

Figure 2:
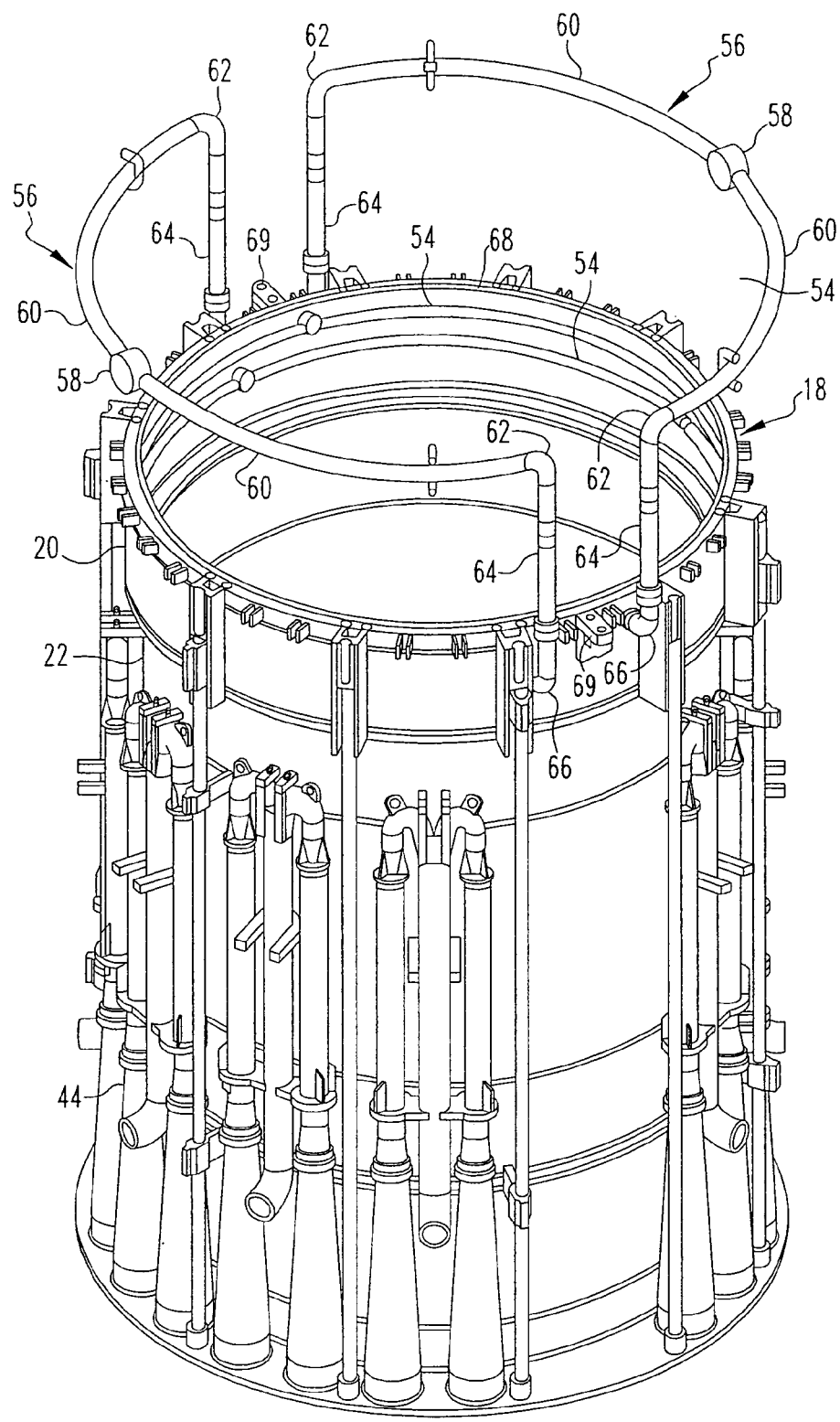
FIG. 2 is a perspective view of a core spray supply piping and a cylindrical core shroud typical of a boiling water reactor.
Figure 3:
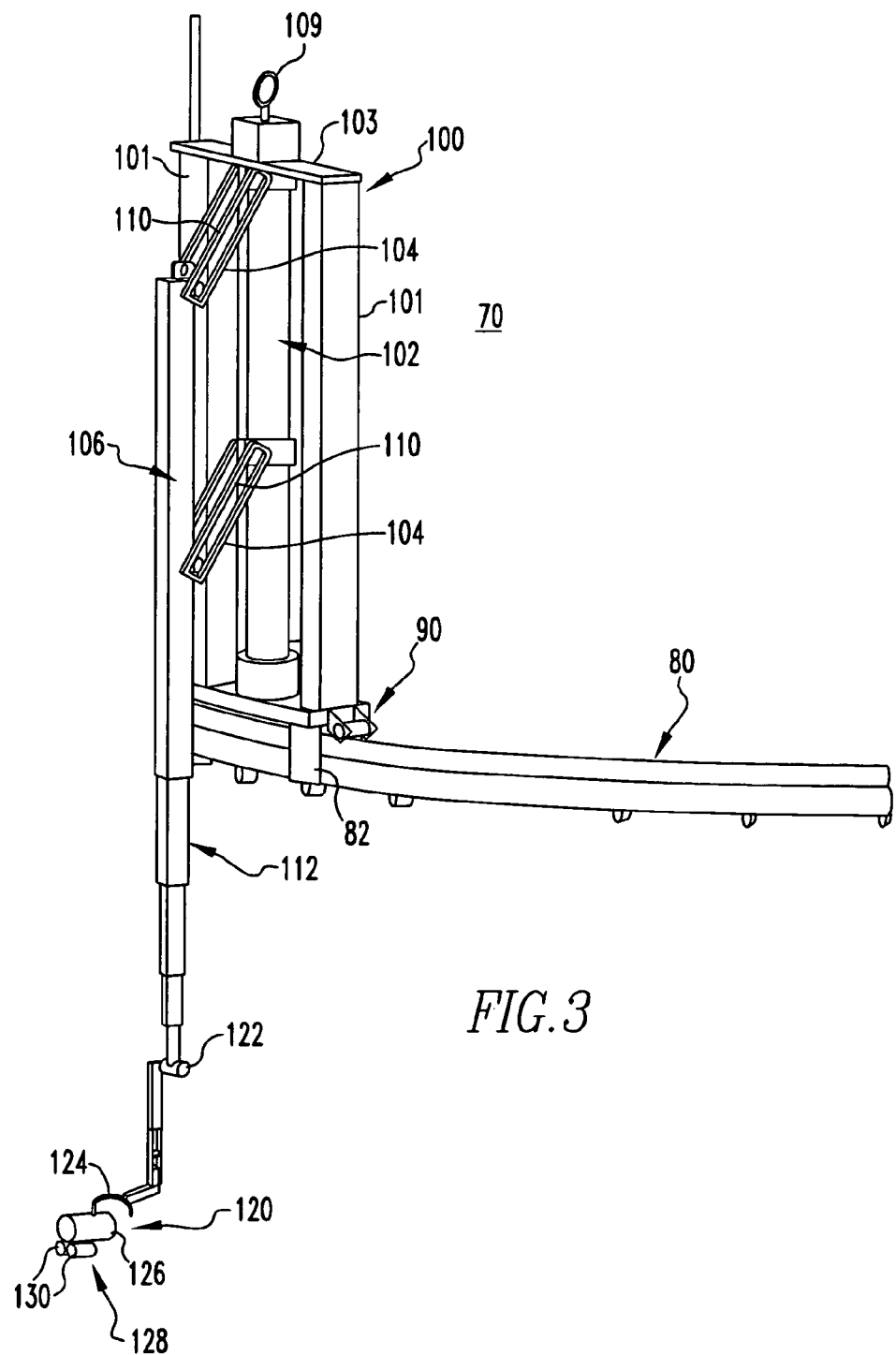
FIG. 3 is a perspective view of the BWR service manipulator of this invention shown mounted on a support rail which is designed to seat on the upper lip of a BWR shroud, deployed in an outboard mode with the pole assembly partially extended.

The service manipulator delivery system 70 of this invention is generally made up of the following major components shown in perspective in FIG. 3. The track system 80 comprises a series of bent plates forming a 360° circle that are adjustable to the diameter of different size reactor shrouds 18 by use of track support columns 84. The track support columns 84 are short and wide and act as beams perpendicular to the steam dam. The track support columns are bolted to the track on the bottom side. Thus use of the support columns enables the track to accommodate differing diameters of steam dams. A powered trolley 90 that rides on the track is guided by guide rails 82 so that it stands vertical without support from other reactor surfaces. The trolley can travel the full 360° of the track system 80. A support column assembly 100 rises up from the trolley and has laterally extending lifting arms 104 that support a pole system 106 inboard or outboard of the shroud 18. The pole system 106 can be lowered into the reactor or annulus outside the shroud to the bottom of the annulus or to the fuel support plate 28 shown in FIG. 2. A flexible arm system 120 is attached to the end of the pole system 106 and can point a camera, positioned at its distal end, at all sides of a component that needs to be inspected. The combination of these components allows visual inspection of components in very tight spaces with accuracy and speed.

The purpose of the service manipulator tool of this invention is to provide a vehicle that can position a camera or other tool in a BWR annulus to inspect welds on the jet pumps 44 shown in FIG. 2 or other areas in the annulus. The tool must necessarily have a certain amount of flexibility to work within the annulus and is designed to also accommodate inspections of the core spray piping, feedwater spargers and core spray spargers that are not in the annulus.

While the tool of this invention 70, shown in FIG. 3, can be designed to ride on the steam dam 68 of the shroud 18, it is more convenient to use the track 80 that can fully support the trolley system 90. The track 90 is made up of four matched marked segments that are assembled on the refueling floor. Each segment is made up of an arc formed by a series of bent plates to provide vertical support to maintain the trolley system in an upright condition. The assembled track 80 is placed on top of the shroud steam dam 68 with a lift rig fitted with air-operated pins that can release the track in this position. Support lugs on the track, not shown, which can mate with corresponding brackets 69 outboard of the shroud 18, locate the track 80 concentrically with the shroud 18.

Figure 6:
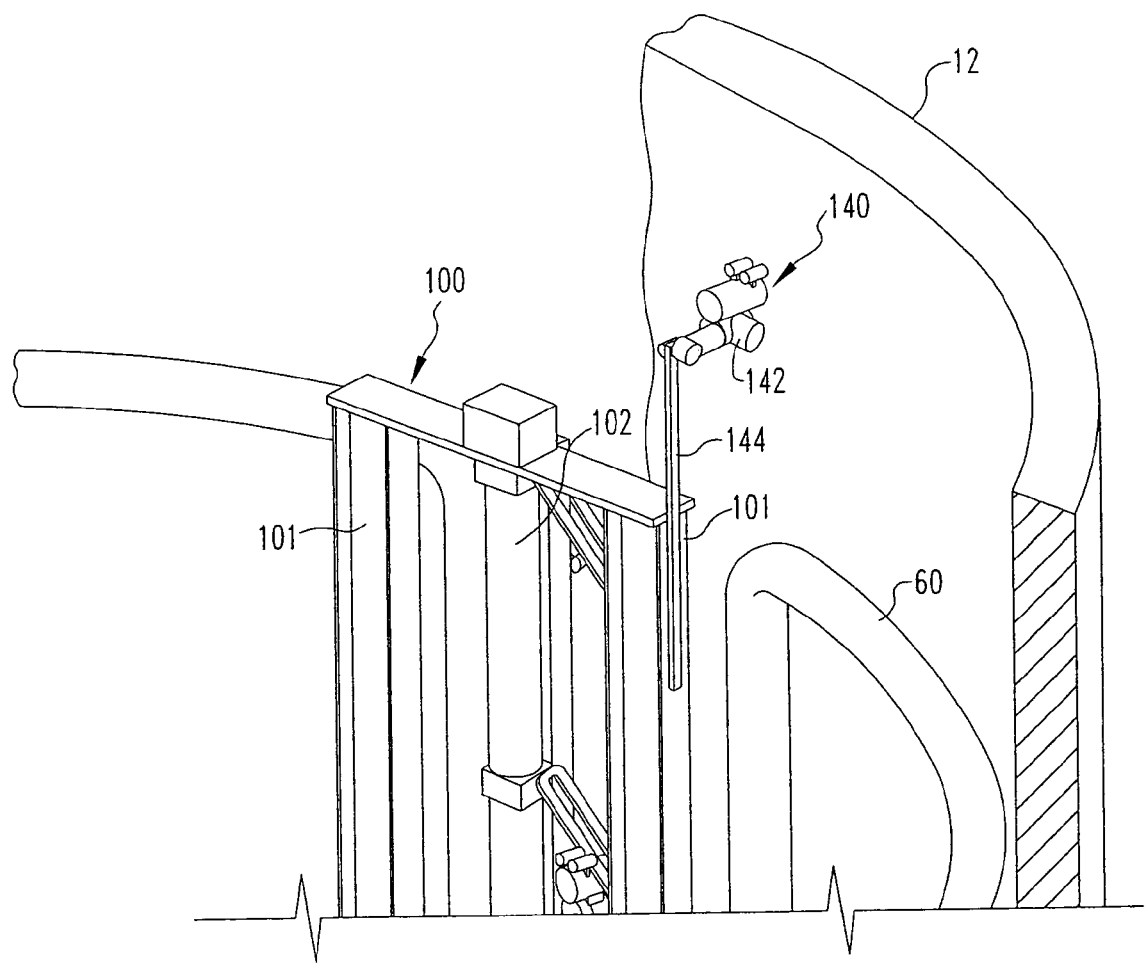
FIG. 6 is a perspective view of an upper camera section that can provide an overview of the deployment of the lower camera end effector as well as inspect the areas surrounding the core spray sparger.
Figure 7:
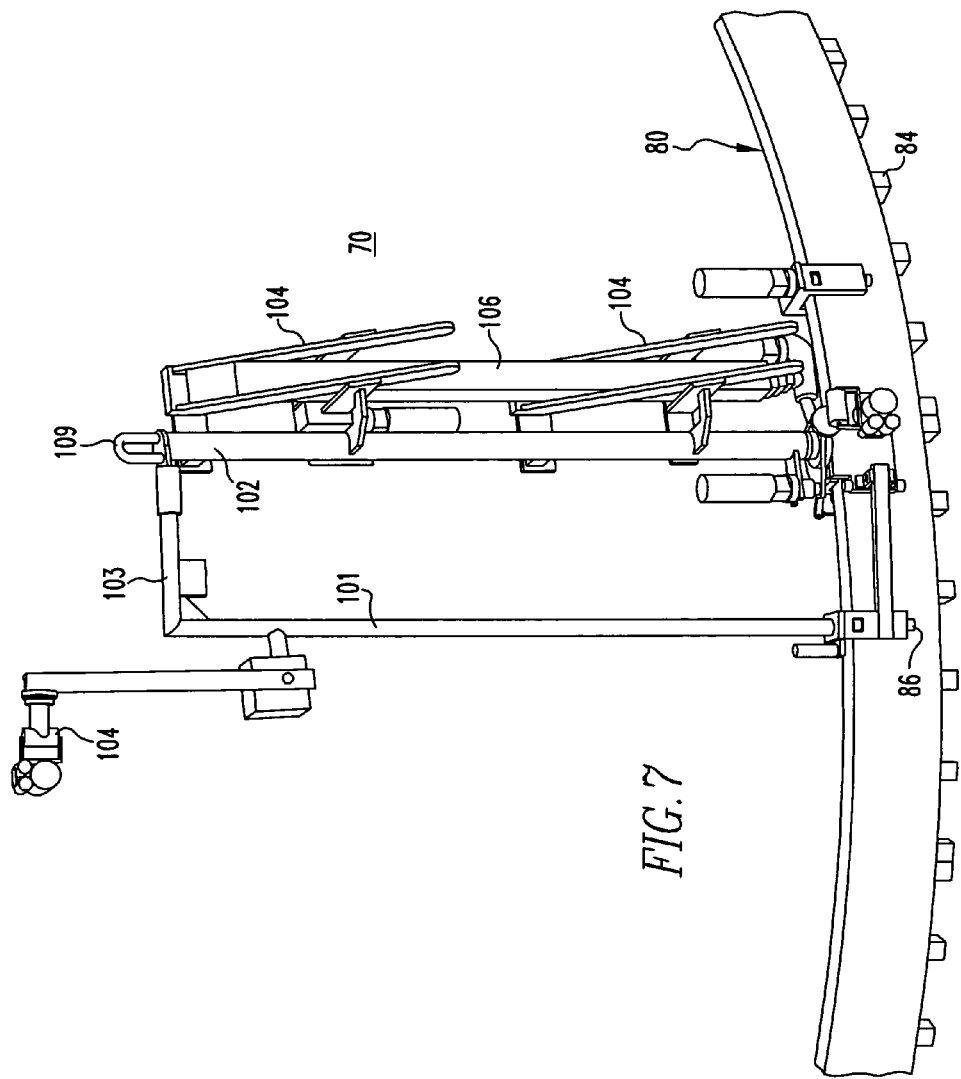
FIG. 7 is a perspective view of a second embodiment of the BWR service manipulator of this invention.

As can be best appreciated from FIG. 7, the trolley system 90 in the preferred embodiment consists of three wheeled trolleys that support the remainder of the operating structure of this invention on the shroud track 80. The center trolley supports the main mast 102. One trolley provides a brace 82 for the main mast 102 and the other mounts the traction drive that powers the trolley around the track 80. One trolley is on either side of the center trolley to provide stability in the radial direction. Each trolley has a set of stationary axels that support wheels that provide lateral support and an additional wheel to provide vertical support. In addition, the axels on the wheels on the inner side of each trolley rotate around a pivot that allows the inside wheels to span over obstacles when lowered onto the track 80. Each of the outer trolleys is provided with a cam 86 operated by an air cylinder that can clamp onto the shroud track 80 to aid stability and traction. The embodiment illustrated in FIGS. 3–6 is substantially identical in function, but employs a single elongated wheeled trolley in place of the three wheeled trolleys.

In the embodiment illustrated in FIG. 7 the support column assembly comprises a main mast 102, which is supported by one side support column 101 through a tie plate 103. Though it should be appreciated that two side support columns 101 may also be employed as illustrated in FIGS. 3–6. A lifting lug 109 is mounted on the top center of the tie plate 103 so the lift rig can hoist the trolley system 90, including the support column assembly 100 in position once the track 80 is placed on the shroud steam dam 68. The main mast 102 is a frame that rotates on a pole that is attached to a remotely-operated motorized chain drive at its rotatable base. The frame is fitted with two laterally extending arms 104 that extend at a downwardly-directed angle, desirably between 45 and 60° from the horizontal and preferably 60° from the horizontal. The two laterally extending arms on either side include a slotted gear track 110. Each arm is formed from an articulated strip of metal that is bent around and welded to the mast 102 and extends on both sides in the downward direction, with the slotted tracks 110 on either side. The pole system 106 is supported by the slotted tracks 110 on either side of the laterally extending arms 104 so that the pole system 106 can be raised and lowered within the slotted track 110 through a remotely-operated motor system, while being maintained parallel to the main mast 102. The pole system 106 is also moved in the horizontal direction as it traverses the track 110, which enables the pole system to avoid interfering with the core spray sparger. The tracks 110 are set at an angle to allow the poles 106 to slide downward before being lowered into the reactor annulus. The main mast frame 102 also provides mounting for the pole lowering hoist and the rotational drive motor that rotates the main mast frame 102 nearly 360° to position the pole system 106 on either the inboard or outboard side of the shroud 18. The tracks allow extra length for the poles while allowing them to swing under the core spray piping. The angular position of the tracks provides a means of moving the poles both vertically and horizontally before extending the poles vertically using only one motor.

The pole system 106 consists of six square poles nested in one another to provide positive rotational and horizontal control to the camera system 120 attached to the end. The overlapping connection between poles is designed so that the poles cannot come apart. The largest outer pole is fitted with wheels to ride in the main mast laterally-extending arm track 110. This maintains the poles 106 parallel to the main mast during all movements. Clearance is provided between poles to allow deflection when they are run into an obstruction.

Figure 4:
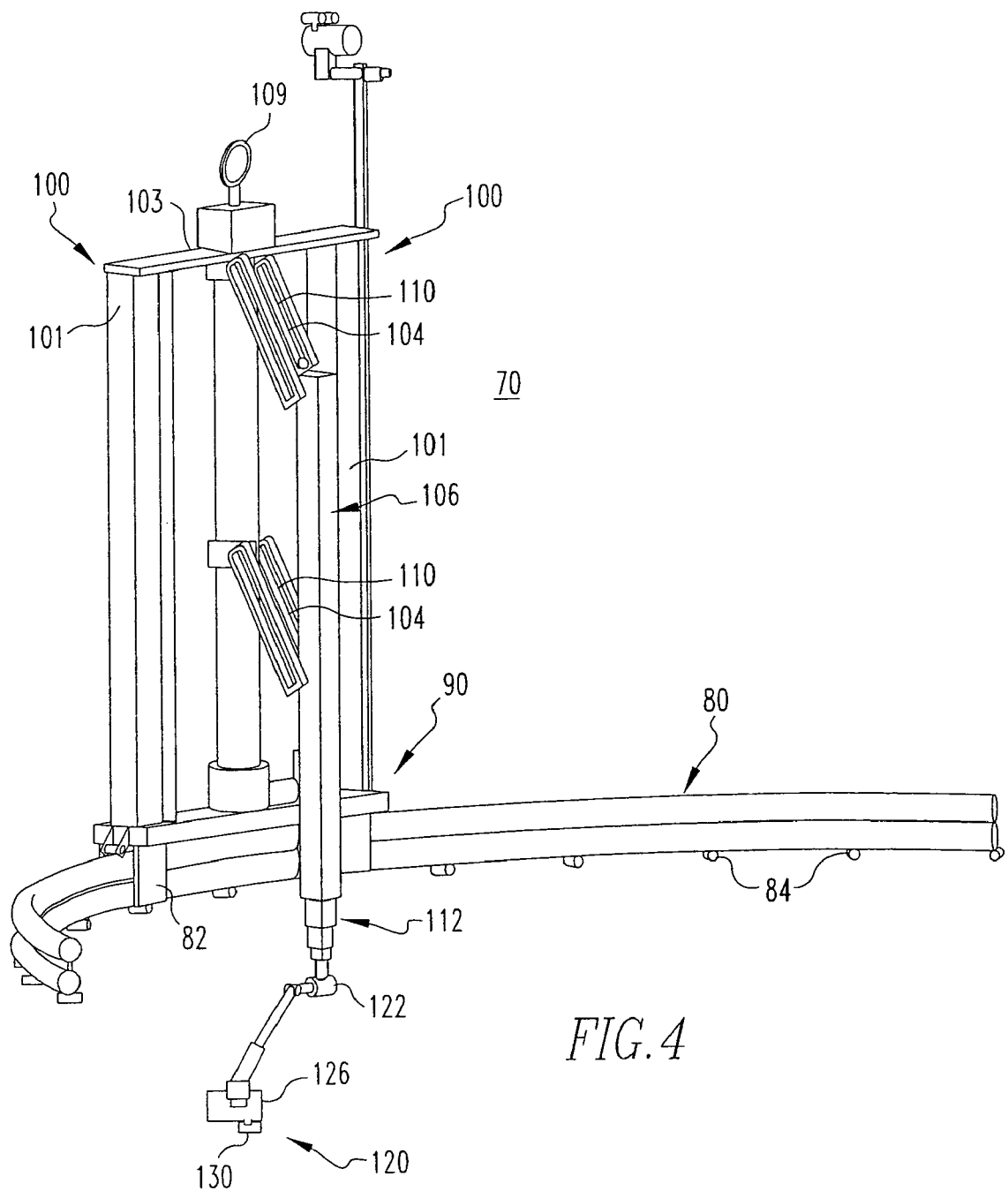
FIG. 4 is a perspective view of the BWR service manipulator of this invention illustrated in FIG. 3 with the pole assembly deployed, in an inboard mode, in a retracted position.

The pole camera system 120 is attached to the bottom of the pole system 106 through a gearbox 122. The gear box transfers the rotational movement of the camera motor to horizontal movement and then through an arm that allows the camera to rotate around the horizontal axis as shown in FIG. 4. This gives the camera system access back towards the shroud from the vertical location of the pole system 106. This system rotates the camera extension of the pole system so that the camera can be angled to take advantage of the greatest opening available. A standard underwater camera system, such as the video camera system manufactured by ROS Incorporated, 5618 Copley Drive, San Diego, Calif. 92111, is employed with a one inch pole connector that is pinned to the arm. The ROS camera is mounted on an operator that has rotational capabilities in two planes. An alternate design for the camera end effector is illustrated in FIG. 3. In the design illustrated in FIG. 3, 180° arc track 124 is employed to support the camera pan tilt table 126. The camera pan tilt table carrying the camera traverses the track around 180° to provide a 180° scan of the component being inspected. In either design, the camera pan tilt table 126 carries a hydrolaser system 128. The hydrolaser system consists of a high pressure block that has two spray nozzles 130 located on it. The block is bolted onto the camera mount so that it moves with the camera. The spray nozzles are located to spray in opposite directions without interference so that the nozzle's spray force is balanced. One of the spray nozzles is aimed at the viewing area of the camera to clean crud off of the area to be inspected. A quarter inch hose provides high pressurized demineralized water to the nozzles 130.

There are four motor systems on the service manipulator of this invention. They operate the pole system hoist 106, the main mast 102 rotation, the track drive 110 and the camera rotation arm 122. Each motor consists of a motor gear box combination sized to each task. A flexible coupling connects the motor to the driven device. The flexible coupling and motor are encased in a water-tight container that is fitted with purge air to maintain dry operation. Motors are controlled by a palm pilot. This is a radio-controlled pendant that signals the control box with the operator's requirements. These are cabled directly to the motors through a solid state control system located on the refueling floor.

An air system is operated from a single control box. One valve and two regulators with gauges control the purge air for the motor systems. One regulator controls the camera system motor because it will be lowered deeper into the annulus than the other motors. A third regulator and gauge controls the air to the trolley clamp cylinders. Where possible, all materials are constructed of aluminum to minimize weight.

Thus, it should be appreciated that the support column assembly 100 is designed so that when it rotates the main mast 102, it positions the lateral support arms 104 under the core spray piping 60 of a BWR. The extendable pole system 106 is then lowered at a 60° angle on the support arms 104 and also clears the lower part of the piping. This allows the use of one motor and adds approximately two feet to each arm, reducing the number of nested sections in the pole system 106. As the pole system 106 is positioned in its lowered state next to the vessel wall, it offers optimum clearance with the jet pumps 44 and other equipment in the annulus of the reactor. Travel around the trolley track 80 is not encumbered by multiple raisings and lowerings of the pole system 106 to traverse around the vessel and fit between jet pump parts. The 180° rotation of the main mast 102 allows inspections to be conducted inside and outside the shroud. The tool is operated independently of the refueling bridge, allowing the refueling to proceed in parallel. The hydrolaser spray nozzle to the camera mount facilitates cleaning of areas to be inspected that normally collect crud.

FIG. 4 shows the service manipulator system of this invention deployed in the inboard direction with the pole system 106 retracted and positioned on the lowest extent of the track 110. In this view, the camera system 120 is shown extended. From this view, it can be appreciated that the track 80 is provided with track support columns 84 that in addition to accommodating different diameter shrouds, as previously mentioned, function as standoffs that facilitate the track clearing obstructions on the shroud lip 68.

Figure 5:
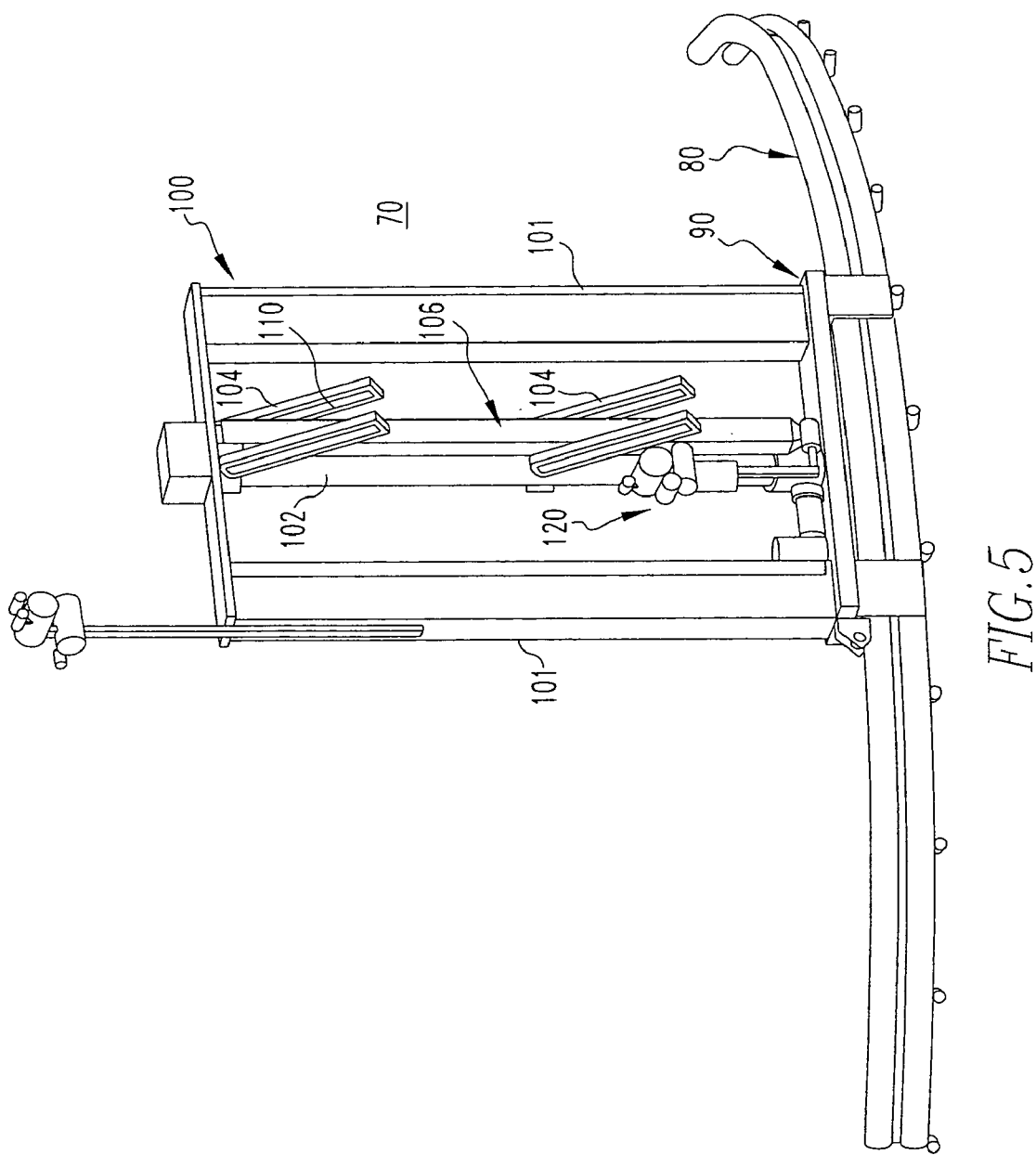
FIG. 5 is a perspective view of the BWR service manipulator shown in FIG. 3, with the pole assembly fully retracted against the support column assembly and the camera end effector nestled against the pole assembly so that the pole assembly can be rotated to an inboard position.

FIG. 5 shows the service manipulator system of this invention previously shown in FIG. 3, with the pole system 106 fully retracted and positioned on the upper extension of the track 110, on the support arms 104, with the camera system 120 completely withdrawn against the pole system 106 so that the pole system can be rotated, with the main mast 102 between the side support columns 101, to an inboard position.

FIG. 6 shows a perspective view of an upper portion of the support column assembly 100 positioned adjacent the core spray sparger. An upper camera system 140 is shown supported from a telescoping track 144 that is mounted on one of the side support columns 101. The camera is rotatably mounted to be able to view and facilitate movement of the other parts of the manipulator and provide an overview of its functioning as well as to provide a capability to inspect the core spray piping and the feedwater sparger. The camera in the camera system 140 as well as the camera on the pole camera system 120 are remotely dockable so they can be affixed, after the system is in place, to avoid damage.

While specific embodiments of the invention have been described in detail, it will be appreciated by those skilled in the art that various modifications and alternatives to those details could be developed in light of the overall teachings of the disclosure. For example, instead of or in combination with the camera, the end effector could include other non-destructive examination probes such as an eddy current transducer. Furthermore, the end effector could incorporate repair tooling such as a welding head. Accordingly, the particular embodiments disclosed are meant to be illustrative and not limiting as to the scope of the invention, which is to be given the full breadth of the appended claims and any and all equivalents thereof.

What is claimed is:

1. A system for delivering a tool to opposite sides of an underlying tubular body, comprising:
   a motorized trolley assembly configured to ride on an upper lip of the underlying tubular body at the same time a refueling operation is underway without obstructing fuel from being moved within or into or out of the core during the refueling operation;
   a substantially vertically supported column assembly having a first part rotatably mounted on the trolley assembly;
   an arm member having one end attached to the vertically supported column assembly and a second end portion laterally extending from the vertically supported column assembly and spaced from the first part such that rotation of the column assembly positions a peripheral end portion of the laterally extending arm member on an inboard side or an outboard side of the underlying tubular body, providing the peripheral end portion of the laterally extending arm member access to both the inboard side and the outboard side of the underlying tubular body;
   an extendable pole assembly having a first part attached to the laterally extending arm member and a second part spaced from the first part of the extendable pole assembly for extending the second part of the extendable pole assembly to a preselected elevation below the upper lip of the underlying tubular body; and
   a tool adjustably attached to the second part of the extendable pole assembly whereby the tool may be tilted or rotated while at the preselected elevation below the upper lip of the underlying tubular body on either the inboard side or the outboard side.

2. The delivery system of claim 1, wherein the column assembly includes:
   a second stationary part;
   a remotely positionable camera mounted on an upper portion of the second stationary part above the first part of the column assembly to provide an overview of the tool as the tool is moved.

3. The delivery system of claim 1, including a substantially continuous track assembly sized and configured to be supported on and around the upper lip of the underlying body and wherein the motorized trolley assembly rides on the track assembly.

4. The delivery system of claim 3, wherein the track assembly extends substantially 360°.

5. The delivery system of claim 4, wherein the track assembly is adjustable to fit different diameter tubular bodies.

6. The delivery system of claim 3, wherein the track guides and supports the trolley so the pole assembly is maintained vertical without support from other reactor surfaces.

7. The delivery system of claim 3 wherein the motorized trolley assembly includes a remotely operated cam that when rotated clamps onto the track to aid stability.

8. The delivery system of claim 1, wherein the first part of the column assembly rotates approximately 180°.

9. The delivery system of claim 1, wherein the tool rotates around an arc approximately 180°.

10. The delivery system of claim 1 wherein the laterally extending arm member extends at a downwardly directed angle.

11. The delivery system of claim 10 wherein the downwardly directed angle is between 45 and 60 degrees.

12. The delivery system of claim 1, wherein the extendable pole assembly includes a plurality of nested telescoping sections.

13. The delivery system of claim 12 wherein each of the sections has a square cross section.

14. The delivery system of claim 1 wherein the tool is a camera including a hydrolaser for directing a stream of high pressure fluid over the area that the camera is viewing.

15. The delivery system of claim 14 wherein the hydrolaser includes two spray nozzles located to direct non-interfering streams of high pressure fluid in opposite directions to balance the reaction forces on the camera.

16. A system for delivering a tool to opposite sides of an underlying tubular body, comprising:
  a motorized trolley assembly configured to ride on an upper lip of the underlying tubular body;
  a substantially vertically supported column assembly having a first part rotatably mounted on the trolley assembly;
  an arm member having one end attached to the vertically supported column assembly and a second end portion laterally extending from the vertically supported column assembly and spaced from the first part such that rotation of the column assembly positions a peripheral end portion of the laterally extending arm member on an inboard side or an outboard side of the underlying tubular body;
  an extendable pole assembly having a first part attached to the laterally extending arm member and a second part spaced from the first part of the extendable pole assembly for extending the second part of the extendable pole assembly to a preselected elevation below the upper lip of the underlying tubular body;
  a tool adjustably attached to the second part of the extendable pole assembly whereby the tool may be tilted or rotated while at the preselected elevation below the upper lip of the underlying tubular body on either the inboard side or the outboard side; and
  wherein the column assembly includes:
    a second stationary part; and
    a remotely positionable camera mounted on an upper portion of the second stationary part above the first part of the column assembly to provide an overview of the tool as the tool is moved, wherein the remotely positionable camera is moveable in the vertical direction to an elevation at least equal to the upper most elevation of the column assembly.

17. A system for delivering a tool to opposite sides of an underlying tubular body, comprising:
  a motorized trolley assembly configured to ride on an upper lip of the underlying tubular body at the same time a refueling operation is underway without obstructing fuel from being moved within or into or out of the core during the refueling operation;
  a substantially vertically supported column assembly having a first part rotatably mounted on the trolley assembly;
  an arm member having one end attached to the vertically supported column assembly and a second end portion laterally extending from the vertically supported column assembly and spaced from the first part such that rotation of the column assembly positions a peripheral end portion of the laterally extending arm member on an inboard side or an outboard side of the underlying tubular body;
  an extendable pole assembly having a first part attached to the laterally extending arm member and a second part spaced from the first part of the extendable pole assembly for extending the second part of the extendable pole assembly to a preselected elevation below the upper lip of the underlying tubular body;
  a tool adjustably attached to the second part of the extendable pole assembly whereby the tool may be tilted or rotated while at the preselected elevation below the upper lip of the underlying tubular body on either the inboard side or the outboard side; and
  wherein the laterally extending arm member extends at a downwardly directed angle and has an elongated dimension in the direction of the downwardly directed angle, including a first track extending along at least a portion of the elongated dimension of the laterally extending arm member and wherein the first part of the extendable pole assembly is supported and moveable along the first track on the laterally extending arm member.

18. The delivery system of claim 17 including a second laterally extending arm member supported at one end from the first part of the column assembly, below and parallel to the other laterally extending arm member, wherein the second laterally extending arm has an elongated dimension having a second track extending along at least a portion thereof parallel to the first track and the first part of the extendable pole assembly is supported on the second track along an elongated dimension of the first part of the extendable pole assembly spaced from the location supported by the first track and the extendable pole assembly is moveable along the second track on the second laterally extending arm member parallel to the column assembly.

* * * * *